United States Patent [19]

Butkiewicz et al.

[11] Patent Number: 4,491,047

[45] Date of Patent: Jan. 1, 1985

[54] DIRECT DRIVE BAND SAW

[75] Inventors: Joseph M. Butkiewicz; Richard B. Brundage, both of St. Louis County, Mo.; Dal M. Rawlins, Henry County, Tenn.

[73] Assignee: Emerson Electric Co., St. Louis, Mo.

[21] Appl. No.: 383,192

[22] Filed: May 28, 1982

[51] Int. Cl.³ .............................................. B27B 13/02
[52] U.S. Cl. ...................................... 83/817; 30/380; 83/100
[58] Field of Search .................... 30/274, 380; 83/100, 83/816–819

[56] References Cited

U.S. PATENT DOCUMENTS

| | | | |
|---|---|---|---|
| 1,636,484 | 7/1927 | Obermoser | 83/817 |
| 3,669,163 | 6/1972 | Crane | 30/380 |
| 4,141,142 | 2/1979 | Karubian | 30/380 |

Primary Examiner—Frank T. Yost
Assistant Examiner—Douglas D. Watts
Attorney, Agent, or Firm—Polster, Polster and Lucchesi

[57] ABSTRACT

A direct drive vertical powered band saw is disclosed having a frame of formed metal which carries an idler wheel and a drive wheel with an endless blade entrained around these wheels. The drive wheel is carried by and affixed to the rotor shaft of an electric motor so that the drive wheel is driven directly by the motor without any intermediate belt drive or the like. In the preferred embodiment, the drive wheel and the motor are located above the idler wheel so that sawdust falls clear of the motor. A fan driven by the motor draws air into the closure for the saw so as to cool the motor and so as to exhaust sawdust from within the saw closure in a predetermined manner.

4 Claims, 2 Drawing Figures

DIRECT DRIVE BAND SAW

BACKGROUND OF THE INVENTION

This invention relates to a direct drive vertical power band saw and more particularly to a light duty woodcutting band saw intended for use in home workshops and the like. However, it will be appreciated by those skilled in the art that the broader aspects of this invention are applicable to other power band saws including larger horsepower band saws such as may be used in commercial applications.

Heretofore, band saws intended for home workshop use typically included a rigid, generally C-shaped frame having a drive wheel journalled on the lower part of the frame and an idler wheel journalled on the upper part of the frame with an endless band saw blade entrained around the drive and idler wheels. As was typical, the drive wheel was driven via a remotely located electric motor by means of a belt and pulley drive. Typically, the band saw was mounted on a workstand and the motor was mounted on the legs of the workstand. The requirement of having to buy a separate electric motor and of having to mount the motor on the legs of the workstand appreciably increased the complexity and cost of the band saw. One advantage enjoyed by prior art band saws utilizing belt and pulley intermediate drives is that the surface or cutting speed of the band saw blade could be readily varied by changing the drive pulleys on the drive wheel and on the output shaft of the motor so as to speed up or slow down the surface speed of the band saw.

It will be appreciated that in conventional home workshops and other environments in which light duty band saws are used, typically only 115 volt, single phase, 60 Hz power is available. Because of the power requirements for light duty woodcutting band saws (e.g., a ½ or ⅓ horsepower motor is typically required), it is highly desirable that a conventional induction 4 pole motor be utilized to drive the saw. If 6 or 8 pole motors are used, these motors are inherently more expensive than 4 pole motors and thus the requirement for a 6 or 8 pole motor would considerably increase the cost and complexity of the motor for the band saw.

A 4 pole induction motor energized by single phase, 60 Hz. 115 volt power generally has a speed of about 1,725 rpm. In the prior art vertical band saws utilizing a belt and pulley intermediate drive, the surface speed of the blade may be readily adjusted merely by changing the ratios between the drive and driven pulleys on the belt and pulley drive. However, in designing a direct drive band saw in which the drive wheel is affixed to and is directly driven by the rotor shaft of the motor, it will be appreciated that the drive wheel of the band saw rotates at the speed of the drive motor.

Direct drive band saws are known utilizing two idler wheels and a directly driven drive wheel in which the drive wheel could be of any desired diameter so as to insure that any desired surface speed of the blade may be obtained. However, these three wheel direct drive band saws are expensive.

While in a two wheel direct drive bandsaw it would be a relatively easy matter to reduce the diameter of the drive wheel such that the surface speed of the blade is within its desired cutting speed range, it will be appreciated that it is highly desirable that the throat of the band saw (i.e., generally the distance between the reaches of the blade entrained around the blade wheels) should be as large as practical so that larger work pieces may be cut on the saw. Also, it is desirable to have as big a diameter of wheel as practical so as to reduce bending of the blade as it is repeatedly wrapped around the blade wheels during operation. By having larger diameter blade wheels, the service life of the blade can be increased.

Further, in cutting wood and other materials which tend to form substantial amounts of sawdust or other fine granular chips, the sawdust heretofore has posed a problem for the drive motor of a band saw located below the saw in that the sawdust would be drawn into the cooling air passages of the motor and into the lubrication system for the bearings of the motor. This accumulated sawdust would oftentimes block the flow of cooling air through the motor causing it to overheat and fail, or would act as a wick so as to draw lubricant from the bearing lubrication system thus resulting in premature failure of the motor.

SUMMARY OF THE INVENTION

Among the several objects and features of this invention may be noted the provision of a direct drive vertical power band saw which utilizes a drive wheel mounted on the drive shaft of the drive motor in which the drive wheel is of a smaller diameter than the idler wheel so that a conventional 4 pole single phase motor may be used and yet such that the surface or cutting speed of the band saw blade is reduced to be within an acceptable cutting speed range and such that the throat distance of the band saw is larger than the diameter of the drive wheel;

The provision of such a direct drive band saw in which the bearings for the drive motor serve a double function as the bearings for journalling the drive wheel of the band saw;

The provision of such a direct drive band saw in which the drive motor is located clear of falling sawdust thereby to minimize the above-mentioned potential for premature motor loss;

The provision of such a direct drive band saw in which air is drawn through the motor for cooling the motor and in which the air is exhausted from the band saw closure at a predetermined location thereby to remove sawdust from within the band saw;

The provision of such a direct drive band saw in which the drive wheel is directly driven by a drive motor thereby eliminating friction losses, remote belt drives, complexity, and expense from the band saw;

The provision of such a direct drive band saw in which it is possible to eliminate the requirement of drive belt tensioning means; and The provision of a direct drive band saw which is self-contained and which may be readily installed on virtually any suitable work support stand.

Other objects and features of this invention will be in part apparent and in part pointed out hereinafter.

Briefly stated, a vertical power band saw has a frame, a drive wheel, and an idler wheel with the drive and idler wheels being spaced vertically of one another and journalled on the frame. An endless, flexible blade is entrained round the wheels with the blade having a vertical reach constituting the sawing reach of the blade and a return reach with a horizontal space between the reaches determining, in substantial measure, the depth of the throat of the band saw. More specifically, the improvement of this invention includes the provision of an electric motor having a shaft extending endwise therefrom. The drive wheel is affixed to the motor shaft and is directly driven thereby. Further, the band saw includes means for mounting one of the wheels for movement toward and away from the other of the wheels thereby to permit tensioning and changing of the blade.

BRIEF DESCRIPTION OF THE DRAWINGS

Corresponding reference characters indicate corresponding parts throughout the several views of the drawings.

DESCRIPTION OF A PREFERRED EMBODIMENT

Figure 2:
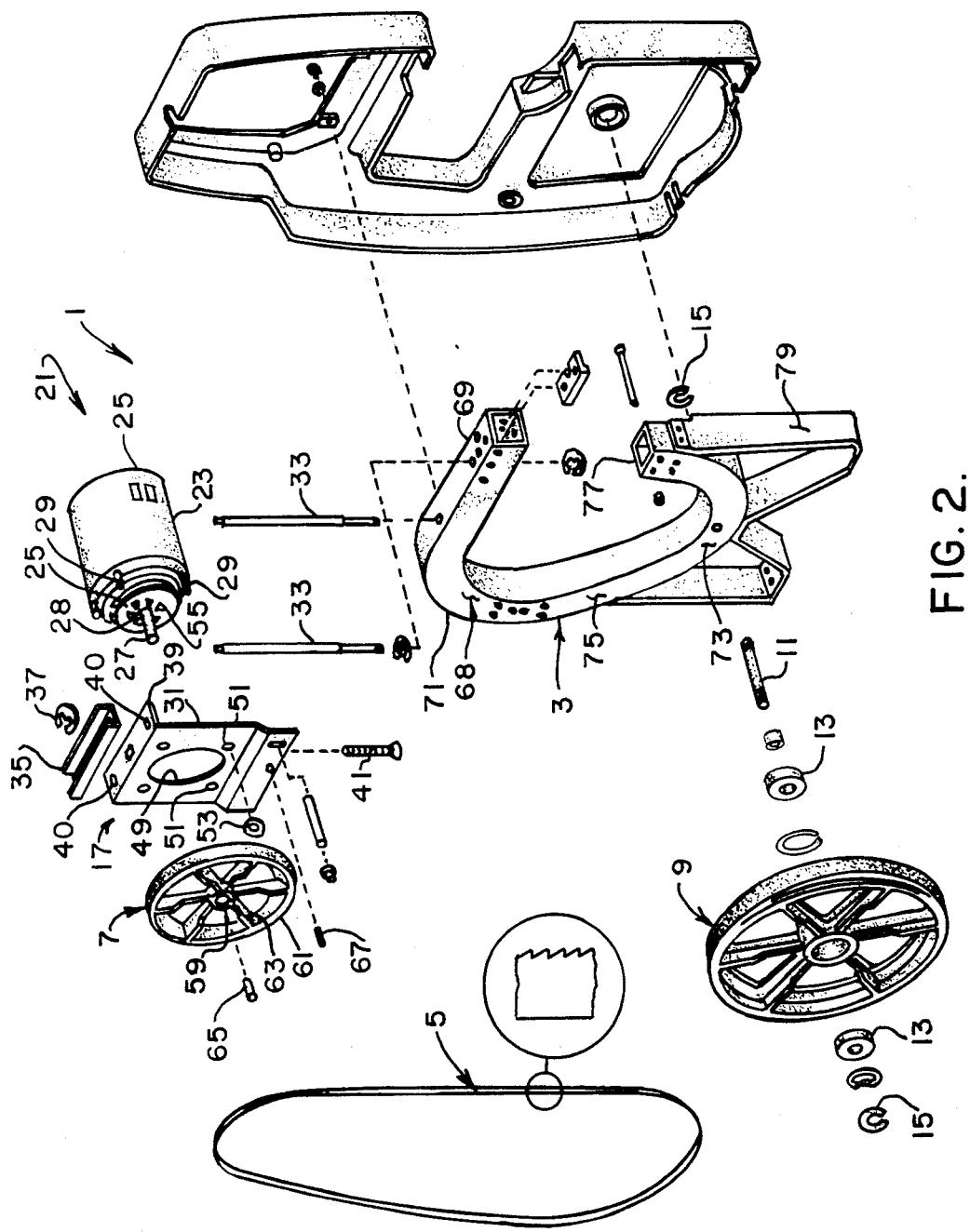
FIG. 2 is a more detailed exploded perspective view of the band saw.

Referring now to the drawings, a direct driven vertical band saw of the present invention is indicated in its entirety by reference character 1. More specifically, the band saw includes a rigid C-shaped frame 3 of formed structural steel (e.g., a seam-weld box beam) which will be described in detail hereinafter. An endless band saw blade 5 (see FIG. 2) is entrained around a drive wheel 7 and an idler wheel 9 journalled on the frame. As best shown in FIG. 2, an idler wheel shaft 11 is secured to and extends out beyond one side face of frame 3 and the idler wheel 9 is journalled on the shaft by means of ball bearings 13 and is held secured on the shaft by means of snap rings 15. It will be appreciated that the axis of shaft 11 establishes the axis and plane of rotation of the idler wheel and that the shaft is accurately positioned on the frame so that the axis of rotation of the idler wheel is accurately established relative to the frame.

As generally indicated by reference character 17, means is provided for mounting one of the blade wheels (e.g., either drive wheel 7 or idler wheel 9) on frame 3 such that the one wheel is selectively movable toward and away from the other wheel thereby to permit changing of endless blade 5. Additionally, the mounting means includes adjustable means, as indicated at 19, for resiliently biasing and tensioning blade 5 whereby, during operation of saw 1, endless blade 5 is maintained under a predetermined tension load thereby to hold the blade in a desired cutting position relative to the workpiece (not shown) being cut.

In accordance with this invention, saw 1 is directly driven by a drive motor, as generally indicated at 21. As shown, drive motor 21 is a single phase, 4 pole induction motor. The drive motor includes a stator 23 having so-called end shields 25 at the ends of the stator housing. As is conventional, motor 21 includes a rotor assembly (not shown) of squirrel cage construction having a rotor shaft 27 extending axially therethrough and out beyond the ends of the motor. The end shields constitute bearing supports for receiving and holding bearings 28 (e.g., a sleeve or self-aligning journal bearing such as is well known to those skilled in the motor art) which journal rotor shaft 27 and maintain the rotor assembly in a predetermined centered position with respect to the stator assembly. Further, end shields 25 are secured in position relative to the stator housing and stator assembly by means of through bolts 29 which extend longitudinally through the motor.

While drive motor was previously described as a single phase, 4 pole motor, it will be understood that other types of electric motors, such as universal or D.C. motors, and even such motors with built-in speed reduction means, may be used to power this bandsaw. However, within the broader aspects of this invention, the term "output shaft" refers to either rotor shaft 27 of motor 21 or the output shaft of a gear reduction drive of a universal or other type of electric motor where the speed reduction means is rigidly mounted with respect to the motor.

Figure 1:
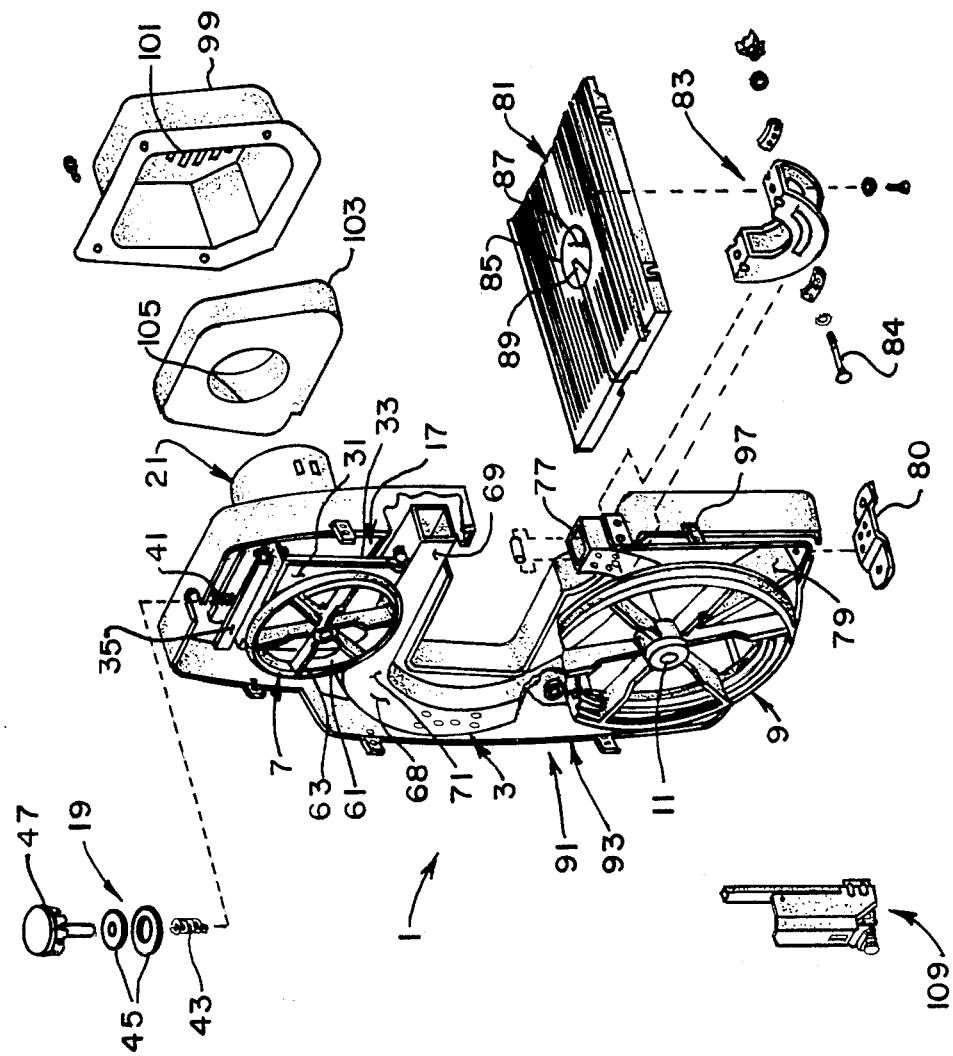
FIG. 1 is an exploded perspective view of a vertical, direct drive band saw of the present invention.
Figure 1:
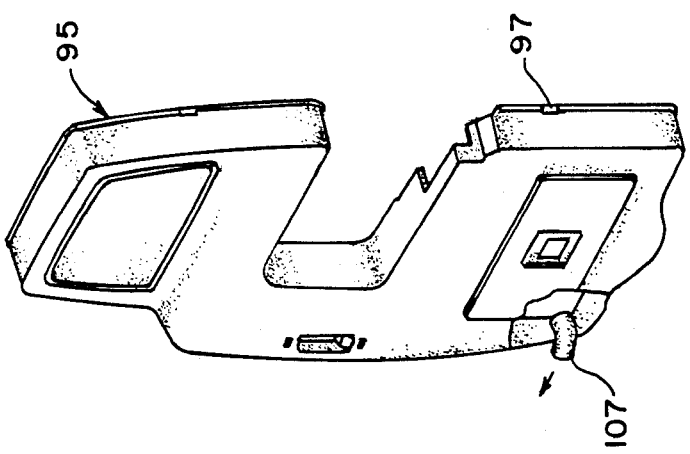

The previously mentioned means 17 is provided for mounting one of the blade wheels 7 or 9 for movement toward and away from the other blade wheel thereby to permit changing of endless blades 5 and to permit tensioning of the blade. As illustrated in FIGS. 1 and 2, drive wheel 7 is preferably carried by a mounting plate 31. However, within the broad concept of this invention, it will be appreciated that drive wheel 7 may be stationarily mounted relative to frame 3 and idler wheel 9 may be mounted on the mounting means 17 for movement toward and away from the drive wheel.

More specifically, mounting means 17 is shown to comprise a pair of spaced apart, parallel guideposts 33 secured to and extending upwardly from frame 3. A support bracket 35 extends between and is secured to the upper end of the guideposts by means of snap rings 37. The mounting means includes the generally vertical mounting plate 31 having a horizontal flange 39 at its upper end, this flange having a pair of openings therein for receiving guideposts 33. Further, a threaded stud 41 is affixed to and extends upwardly from the flange through an opening (not shown) in support bracket 35. A compression coil spring 43 surrounds the portion of stud 41 extending above support bracket 35 and washers 45 bear against the upper end of spring 43. An adjustable knob 47 is threaded onto the free end of stud 41 and thus, upon threading knob 47 onto stud 43, spring 43 is compressed and mounting plate 31 is resiliently forced vertically on guideposts 33 toward bracket 35 and thus the adjustment knob and spring constitutes means 19 for tensioning the blade and means for maintaining a predetermined resilient load on the blade. It will be understood that by loosening adjustment knob 47, the mounting means 17 for the drive wheel may be moved toward idler wheel 9 so that the endless blade may be readily entrained around the drive and idler wheels and upon moving the mounting means and the drive wheel away from the idler wheel, a predetermined tension load may be applied to blade 5.

Mounting plate 31 is shown to include a central opening 49 through which a portion of one end shield 25 and rotor shaft 27 extends. Around central opening 49, a plurality (e.g., four) of apertures, as indicated at 51, is provided for receiving through bolts 29. As indicated at 53, nuts are provided for being threadably received on the throughbolts extending through apertures 51 for securely mounting motor 21 in place on mounting plate 31. End shields 25 have openings 55 therein.

As indicated at 59, drive wheel 7 includes a hub having an opening therein for receiving rotor shaft 27. The drive wheel further includes a rim 61 and a plurality of radial vanes 63 extending between hub 59 and rim 61. For reasons as will be more fully explained hereinafter, radial vanes 63 on drive wheel 7 are so shaped as to constitute air moving fan blades for drawing air into band saw 1 via the openings extending through the end shields such that the air flow passes through the motor and around the windings of the motor thereby to cool the motor. A pin or key 65 is insertable into hub 59 thereby to securely affix drive wheel 7 to rotor shaft 27.

Further, a set screw 67 is threaded into the bottom portion of mounting plate 31 and the inner end of the set screw is engagable with a portion of frame 3 so as to permit adjustment of the vertical plane of mounting plate 31 and to thereby simultaneously adjust the axis of rotor shaft 27 of motor 21 and the plane of rotation of drive wheel 7 relative to the plane of frame 3. In this manner, set screw 67 constitutes means for selectively varying or aligning the plane of rotation of drive wheel 7 relative to the plane of rotation of idler wheel 9.

As best shown in FIG. 2, frame 3 comprises a unitary frame member 68 of box beam construction having an upper horizontal portion 69 on which mounting means 17 for drive wheel 7 and motor 21 is located. At the left end of horizontal portion 69 (as viewed in FIG. 2), a first bend 71 is provided in frame member 68 extending downwardly and rearwardly. A second bend 73 is provided in the frame member 68 generally below horizontal portion 69 and a transition section 75 interconnects first bend 71 with second bend 73. The upper end of the second bend 73, as indicated at 77, extends vertically upwardly and is spaced below horizontal portion 69. As indicated at 79, support legs are secured to frame member 68 such that the frame may be rigidly mounted to a workstand or the like by means of feet 80. As shown in FIG. 2, shaft 11 is secured in place on second bend 73 and guideposts 33 extend upwardly from horizontal portion 69. The horizontal portion 69 and first bend 71 permit a relatively large throat opening for the band saw. It will be appreciated that by utilizing a formed structural frame member 68 (as opposed to a die cast frame), a considerable savings in tooling costs can be realized thus enabling the band saw of this invention to be manufactured at considerably lower costs than prior art band saws utilizing die cast frames.

As indicated generally at 81, a work table is provided which is mounted on the upper end 77 of frame member 68 by means of an adjustable table support mechanism 83 thereby to permit the table to be rotated about an axis (i.e., the axis of bolt 84) generally parallel to the axis of rotation of the drive wheel and the idler wheel so that cuts on a workpiece may be made at a bevel. Worktable 81 includes a central table opening 85 through which the cutting reach of blade 5 passes. An insert 87 having a small blade slot 89 therein is received within the table opening and thus serves as a support for the work immediately adjacent the cutting reach of the blade.

As generally indicated at 91, power band saw 1 is provided with a cover assembly enclosing upper drive wheel 7, lower idler wheel 9, and frame 3, and all of endless blade 5 except for a relatively short length of the cutting reach of the blade extending downwardly from upper frame portion 69 through the worktable 81. More specifically, cover assembly 91 includes a stationary cover 93 securely mounted to frame 3. A removable cover 95 encloses the other side of the band saw and is securely held in position on the stationary cover by means of clasps or latches 97. It will be understood that with the removable cover 95 secured in place on stationary cover 93 by means of latches 97, the stationary and removable covers substantially sealably engage each other along their mating surfaces. While cover assembly 91 is not intended to be airtight, it will be appreciated that the cross-sectional area of the openings in the cover are limited so that circulation of air within the cover assembly may be directed in predetermined directions within the cover assembly upon operation of the motor and upon rotation of drive wheel 7 such that the radial vanes 63 of the drive wheel constitute an air moving fan. The cover assembly further includes a motor shroud 99 attached to the stationary cover 93 with the motor shroud enclosing the end of motor 21 and having vent openings 101 therein in register with the openings 55 in the outermost end shield 25 of motor 21.

As best shown in FIG. 2, motor shroud 99 is substantially larger than the diameter of motor 21 and a flexible seal 103 of suitable elastomeric foam material is received within shroud 99. Seal 103 has a central opening 105 therein adapted to fit around and to sealably engage stator 23 such that with inlet openings 101 in motor shroud 99 in communication with the end shield openings 55 in motor 21 and such that with motor 21 in operation driving blade wheel 7 at its operational speed, air is forceably drawn into cover assembly 99 via the openings 101 in motor shroud 99, and is forceably drawn axially through motor 21 thereby to cool the motor. Thence, the air within cover assembly 91 is forced downwardly through the cover assembly into the lower portion of the cover assembly surrounding idler wheel 9 and is exhausted from a discharge connection 107 at the bottom of removable cover assembly 95. It will be understood that a discharge connection 107 may optionally be connected to a vacuum sawdust collecting system such as generally used in woodworking shops or it may be connected to a suitable vacuum cleaner or the like.

In accordance with this invention, those skilled in the art will recognize with drive motor 21 located above the idler wheel 9 and above table 81, sawdust produced during cutting operations will tend to fall downwardly away from the drive motor. Additionally, with air positively directed axially through motor 21, clean air is continually drawn into the motor for cooling purposes and thus the tendency of the motor to become covered with sawdust and the like is markedly reduced. Still further, because cover assembly 91 fits relatively tightly around the saw blade and frame, the cross-sectional area of the openings in the cover assembly is limited thereby ensuring that the majority of the air drawn into the cover assembly flows through the cover assembly in a predetermined direction for discharging the air and sawdust accumulating within the cover assembly (particularly the lower portion of the cover assembly) therefrom via the discharge spout 107. Air deflecting vanes (not shown) may be provided in stationary cover 93 so as to ensure that the air flow within the cover assembly is maintained in a predetermined direction.

As shown in FIG. 1, a blade support 109 secured to frame portion 69 which is engagable with the cutting reach of the blade adjacent worktable 81 is provided for supporting the band saw blade during cutting in the conventional manner. Since this blade support does not, per se, constitute a part of this invention, its construction and operation will not be described in detail. Likewise, the adjustment means 83 for worktable 81 and the electrical switches (not shown) for controlling operation of motor 21 will not be described in detail.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

We claim:

1. In a vertical power band saw having a frame, a driven wheel and an idler wheel spaced vertically from one another and journalled relative to said frame, and an endless flexible blade entrained around said wheels with said blade having a vertical reach constituting the sawing reach of the blade and a return reach with the horizontal distance between said reaches determining, in substantial measure, the depth of the throat of said saw, said frame having means for mounting one of said blade wheels thereon for movement toward and away from the other of said blade wheels, wherein the improvement of this invention comprises: an electric motor having a shaft extending endwise therefrom, said drive wheel being affixed to said shaft and being directly driven thereby, said drive wheel being of a smaller diameter than said idler wheel with the vertical cutting reach of said blade being tangent to said drive wheel and to said idler wheel, said motor being secured to said mounting means, said mounting means comprising a pair of vertical guide rods stationarily secured relative to said frame and a generally vertically extending mounting plate slidable on said guide rods, said mounting plate having a plurality of apertures therein, said motor having a plurality of through bolts extending therethrough, said through bolts being received in said apertures in said mounting plate and being secured to said mounting plate, thereby to secure said motor to said mounting plate, said mounting plate with said motor secured thereto being movable on said guide rods toward and away from said idler wheel, said mounting means further including adjustable means for selectively varying the plane of said mounting plate and thus the plane of rotation of said drive wheel.

2. In a vertical power band saw as set forth in claim 1 wherein said motor includes a rotor with said shaft being coaxial with said rotor and being rotatable therewith, a stator in which said rotor is rotatable, at least one bearing mounting member secured to said stator at the end of said motor adjacent said drive wheel, a bearing carried by said at least one bearing mounting member for receiving and journalling said output shaft whereby said bearing serves the double function of journalling both the rotor and the drive wheel.

3. A power band saw as set forth in claim 1 further comprising means for resiliently biasing said drive wheel away from said idler wheel so that with said blade entrained around said blade wheels, said blade is resiliently stretched taut.

4. In a power band saw as set forth in claim 1 wherein said motor is a four pole induction motor having a speed of about of 1725 rpm.

* * * * *